United States Patent

[11] 3,542,069

| [72] | Inventor | Napolean E. Ollison<br>P.O. Box 429, East Elmhurst, New York 11369 |
|------|----------|---|
| [21] | Appl. No. | 731,410 |
| [22] | Filed | May 23, 1968 |
| [45] | Patented | Nov. 24, 1970 |

[54] APPARATUS FOR AUTOMATICALLY FEEDING WATER AT SPACED TIME INTERVALS
2 Claims, 13 Drawing Figs.

[52] U.S. Cl. .................................................. 137/624.21, 222/70; 119/51.15
[51] Int. Cl. ..................................................... A01k 7/02, A01g 27/00
[50] Field of Search ........................................ 137/624.11, 624.21; 119/51.15, 51.12; 222/70, 166; 239/70

[56] References Cited
UNITED STATES PATENTS

| 849,169 | 4/1907 | Stein | 119/51.15 |
| 879,637 | 2/1908 | Hauschildt | 137/624.21X |
| 2,791,984 | 5/1957 | Franklin | 119/51.12 |
| 3,115,027 | 12/1963 | Anderson | 119/51.15X |
| 3,178,069 | 4/1965 | Mundhenke | 222/166 |

*Primary Examiner*—Alan Cohan
*Attorney*—Polachek and Saulsbury

ABSTRACT: Apparatus for automatically feeding water to plants and to drinking water vessels at spaced time intervals without the services of an operator. The apparatus includes a tiltable container for a supply of water and an alarm clock mechanism for tilting said container at spaced time intervals. When the container is tilted, the water flows by gravity through a hose operatively connected to the container and from the hose to a pair of branch hose lines adapted to feed water to various articles such as a potted plant and a drinking vessel. Means is provided for controlling the flow of water through the branch hose lines. Means is also provided for manually tilting the water container.

Patented Nov. 24, 1970

INVENTOR.
NAPOLEAN E. OLLISON
BY
Polachek & Saulsbury
ATTORNEYS.

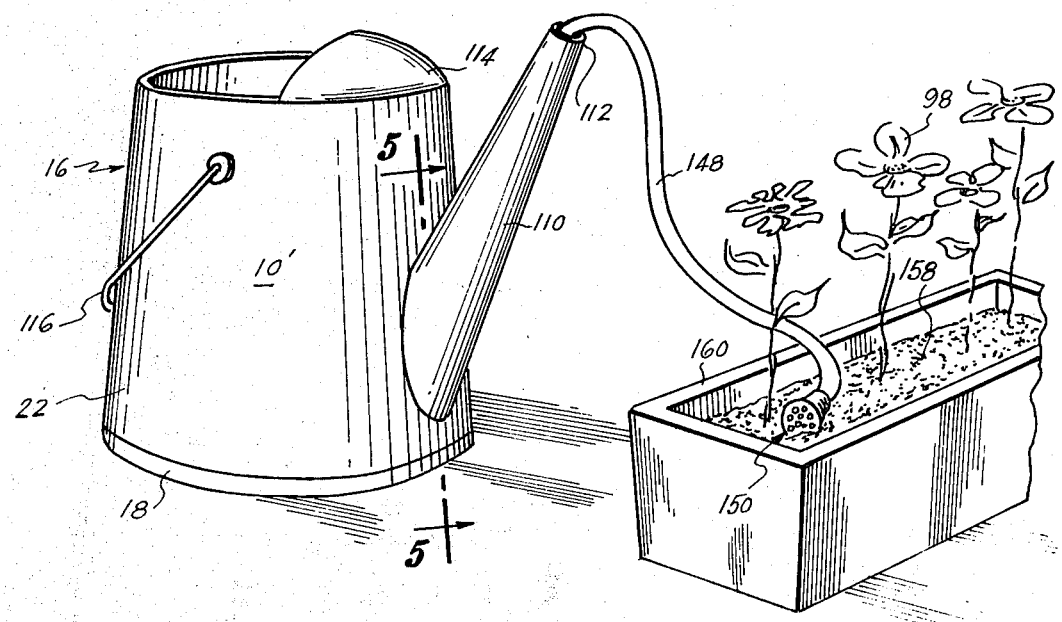
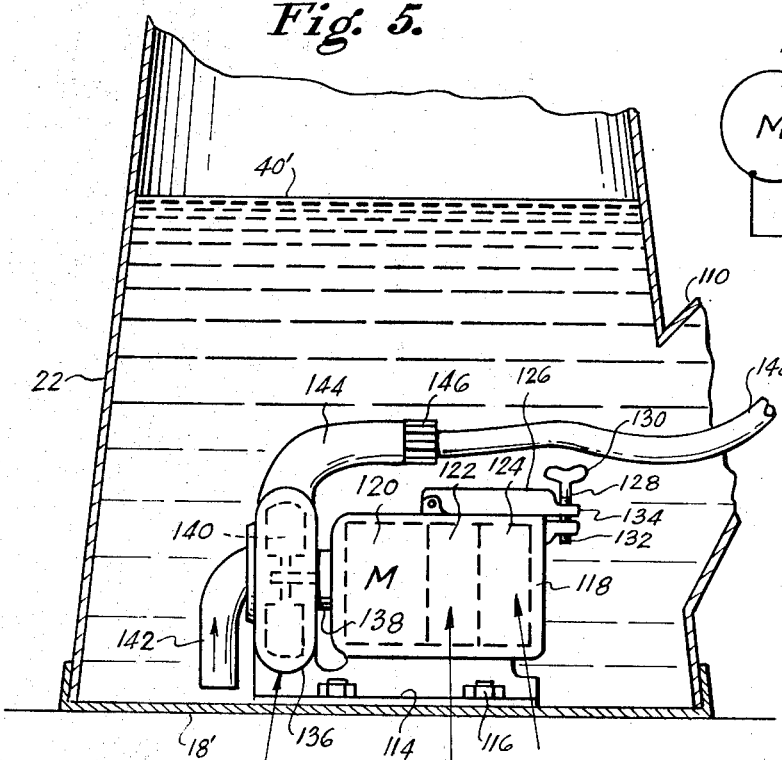
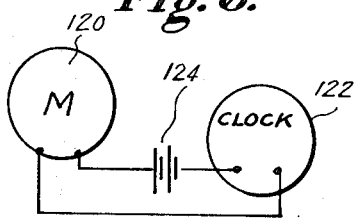
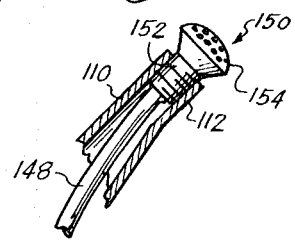

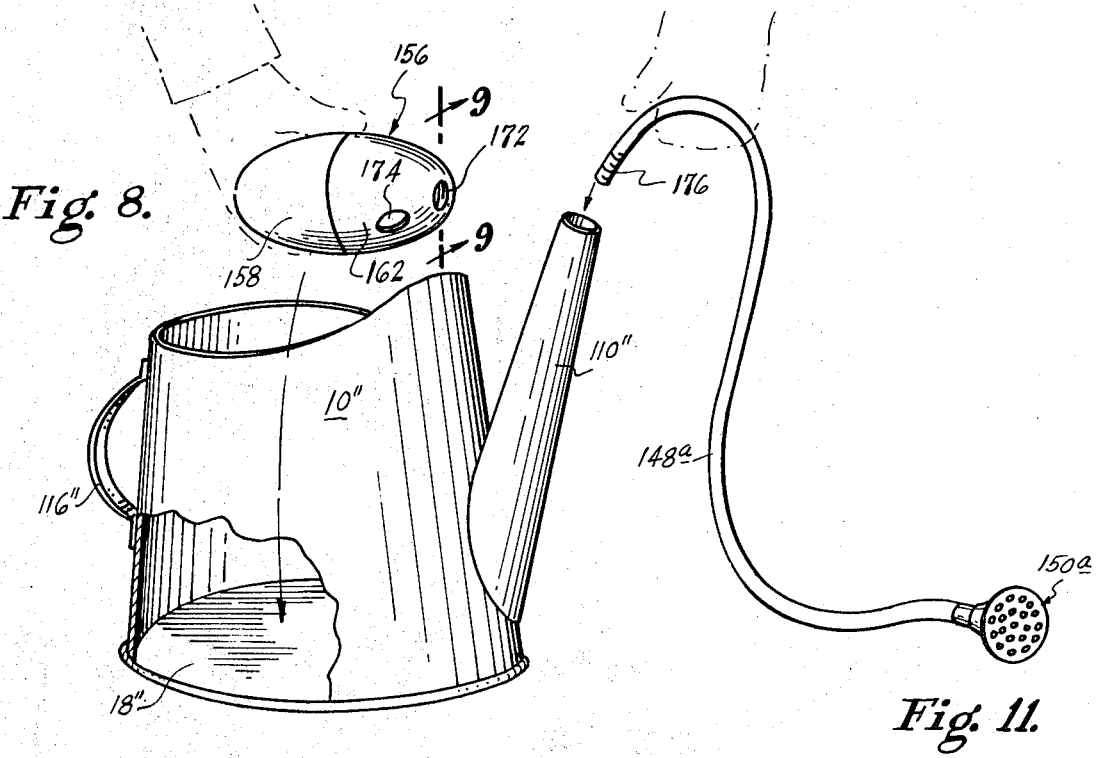
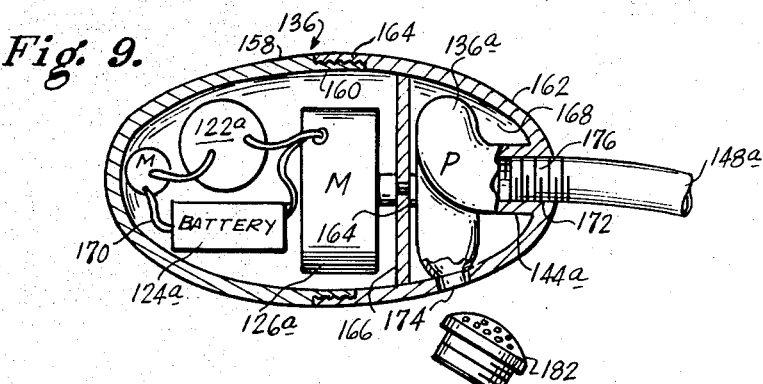
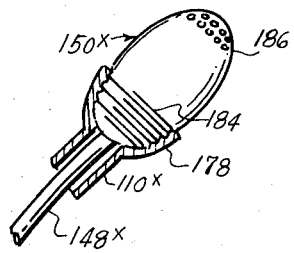
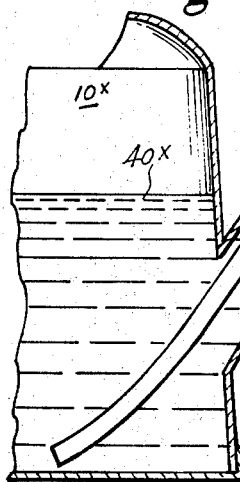
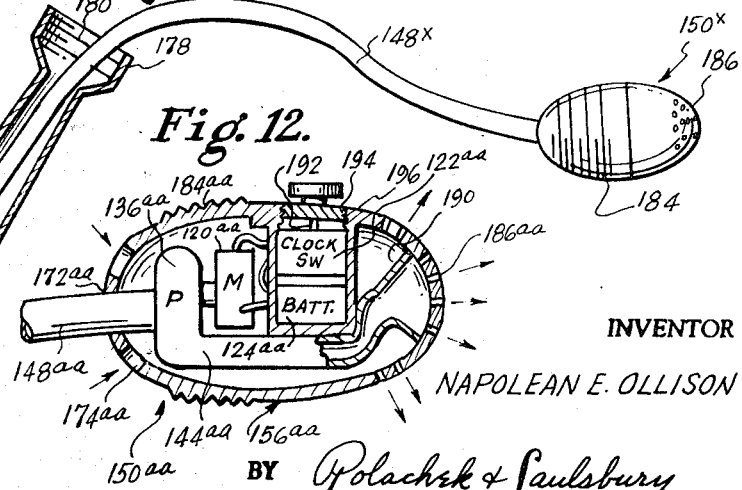
INVENTOR
NAPOLEAN E. OLLISON
BY Polachek & Saulsbury
ATTORNEYS.

APPARATUS FOR AUTOMATICALLY FEEDING WATER AT SPACED TIME INTERVALS

This invention relates to apparatus for automatically turning on and feeding water for watering plants and/or automatically supplying drinking water for animals and the like at predetermined time intervals.

A principal object of the present invention to provide apparatus of this kind that is efficient in operation, easy to manipulate and to control.

FIG. 3a is a sectional view taken on the plane of the line 3a–3a of FIG. 1.

FIG. 4 is a perspective view of apparatus embodying a modified form of the invention shown watering a plant.

FIG. 5 is an enlarged vertical sectional view taken on the plane of the line 5–5 of FIG. 4.

FIG. 6 is a view showing the electric circuit for the motor and clock of FIG. 4.

FIG. 7 is a detail view of the spout and spray of FIG. 4.

FIG. 8 is a disassembled perspective view of another modified form of the invention, parts being shown in section.

FIG. 9 is an enlarged sectional view as seen from the line 9–9 of FIG. 8 the hose being shown connected to the pump.

FIG. 10 is a fragmentary vertical sectional view of still another modified form of the invention, the spout cap being shown detached.

FIG. 11 is a detail of the nozzle and spray head in operative position on the spout.

FIG. 12 is a central vertical view of a further modified form of casing and spray head.

Figure 1:
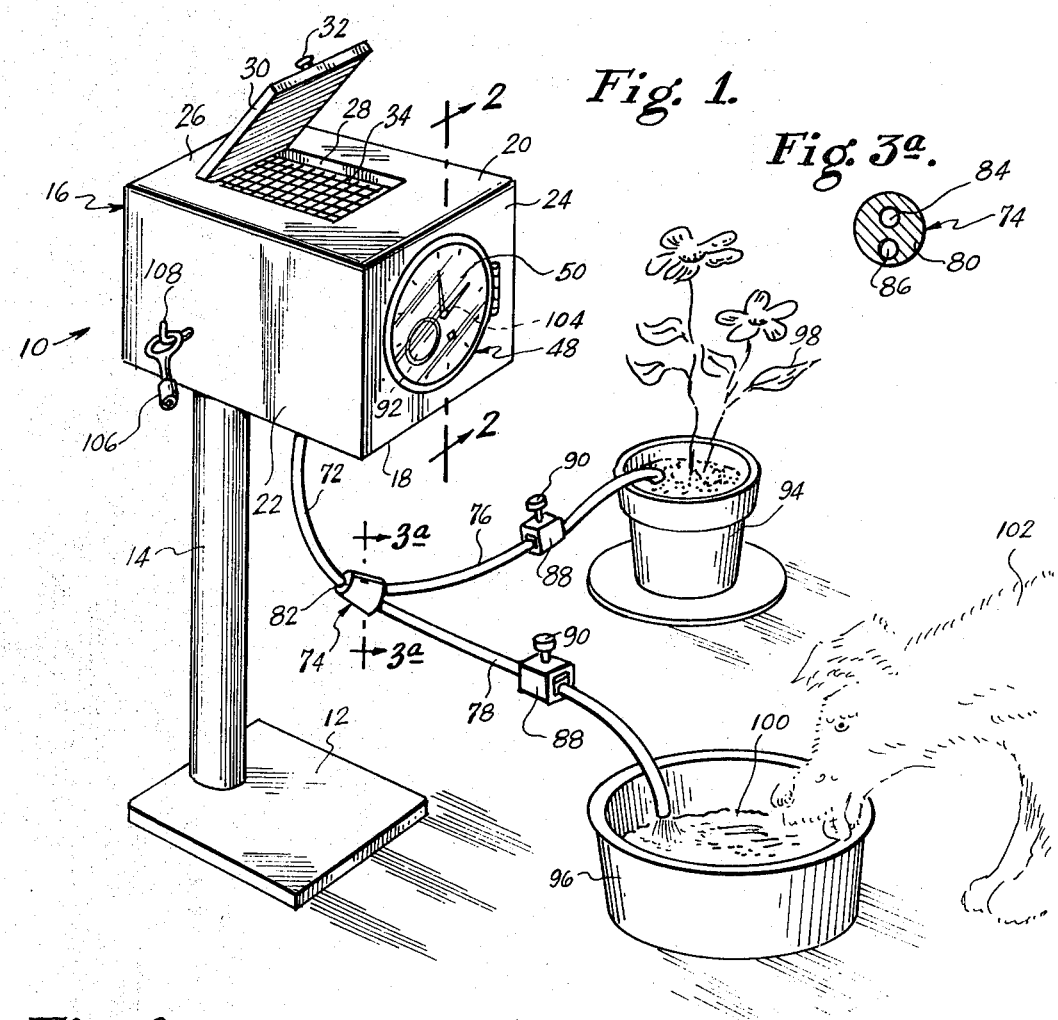
FIG. 1 is a perspective view of apparatus embodying one form of the invention shown watering a plant and filling a container for drinking water for animals.

Referring now in detail to the various views of the drawings, in FIG. 1 apparatus embodying one form of the invention is illustrated and designated generally at 10. The apparatus 10 comprises a flat base board 12 mounting an upright post 14 which supports a box 16 rectangular in configuration at the top thereof. The box 16 has a bottom wall 18, top wall 20, sidewalls 22,22 front end wall 24 and rear end wall 26. The top wall 20 is formed with a central opening 28 adapted to be closed by a hinged cover 30 having a knob 32. A screen 34 extends across the opening 28 and is secured in place by nails 36.

Figure 2:
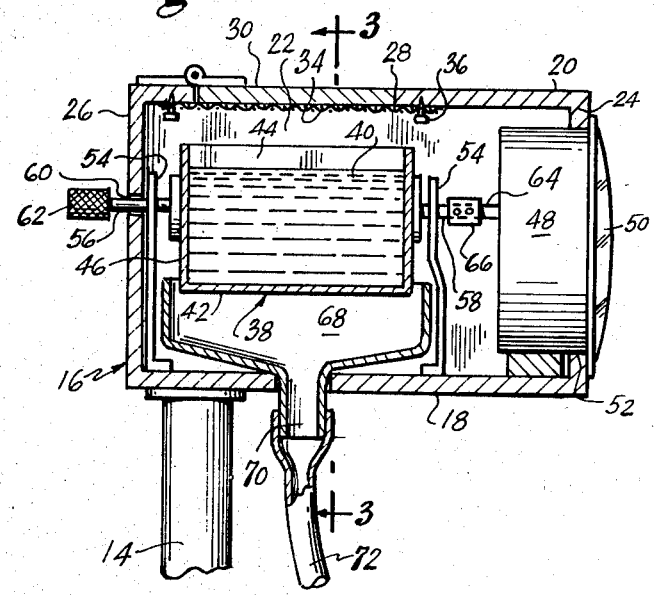
FIG. 2 is a vertical sectional view taken on the plane of the line 2–2 of FIG. 1.
Figure 3:
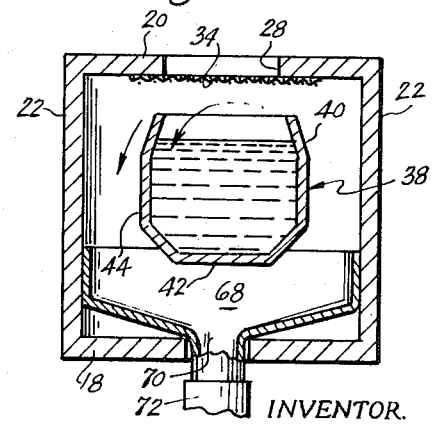
FIG. 3 is a vertical sectional view taken on the plane of the line 3–3 of FIG. 2.

The box 16 houses a semicylindrical container 38 for water 40 having a flat bottom wall 42 and slightly curved sidewalls 44, end walls 46,46 and being open at the top as viewed in FIGS. 2 and 3. A stem sound alarm clock 48 is also housed in the box 16 with its face 50 extending through a circular opening 52 in the front end wall 24 of the box.

The water container 38 is tiltably mounted on a pair of brackets 54 inside the box and is mounted on opposed stub shafts 56 and 58. Shaft 56 extends loosely through a hole 60 in the rear wall 26 of the box and is provided on its outer end with a knurled knob 62 for manually tilting the water container 38. Shaft 58 is joined to the alarm windup shaft 64 of the alarm clock 48 by means of a joint 66. A shallow dish-shaped device 68 having a tubular outlet 70 is positioned in the box under the water container so that when the container is tilted the water spills into the dish-shaped device and out through the outlet 70 into a hose 72 attached to the free end of the outlet 70. The screen 34 permits water to be placed in the container 38 but prevents foreign matter from entering into the interior of the box. The outer free end of the hose 72 is equipped with a connecter device 74 for connecting the hose 72 to a pair of branch line hoses 76 and 78. The connecter device has a cylindrical body 80 with an inlet opening 82 communicating with two outlet socket openings 84 and 86. Branch line hose 76 is connected to the connecter device 74 by inserting one end thereof into socket opening 84, and branch line hose 78 is similarly connected to socket opening 86. Tubular clamps or valves 88,88 are slidably mounted on the branch line hoses 76 and 78 for controlling the flow of water therethrough. A setscrew 90 in each valve is adapted to shut off the supply of water flowing through the respective branch line hose.

The alarm clock 48 is provided with the usual mechanism indicated generally at 92 for tripping the alarm mechanism at predetermined time intervals.

In use, assuming that the alarm clock mechanism has been properly wound and the time for the tripping thereof properly set as indicated by the mechanism 92, the apparatus 10 is placed at a spot convenient to a pot 94 and/or a water pan 96. The free end of branch line hose 76 is placed inside the pot 94 for watering the plant 98 therein and/or the branch line hose 78 may be placed inside the pan 96 for supplying drinking water 100 thereto for animals such as the dog 102. It will be understood that either branch line hose or both may be readily shut off by the screws 96 as desired. When the hour hand 104 of the clock mechanism reaches the predetermined hour set by the mechanism 92, the alarm mechanism will become activated which in turn will, through the shaft 64, turn the stub shafts 56 and 56 thereby tilting the water container 38 spilling the water through the opening therein into the dish-shaped device 68 and out through the outlet 70 into the main hose 72 and through the connecter 74 to the branch line hoses 76 and 78 for the desired purposes.

If desired, the water container 38 may be manually tilted at any time by means of the knob 62.

A key stem 106 is shown supported on a hook 108 on one of the sidewalls 22 of the box 16 for winding the alarm clock mechanism.

In FIGS. 4 to 7, inclusive, a modified form of the invention is shown wherein the water container takes the shape of a water can 10' having a tapered cylindrical body 16' with bottom wall 18', sidewall 22' and being open at the top. An elongated spout 110 extends upwardly from the sidewall 22' to a point slightly above the top of the body of the can. The spout tapers upwardly and inwardly and is open at the top, the opening being provided with internal screw threads 112. The spout communicates with the interior of the can. A guard wall 114 extends across a portion of the open top to prevent water from spilling thereover. A bail-shaped handle 116 is pivotally fixed on the side wall 22'.

Inside the body 16' of the can on the bottom wall 18' there is a base plate 14 secured to the bottom wall by means of bolts 116. A water tight cylindrical casing 118 is supported on the base plate and mounted inside the casing 118 in side by side relation is an electric motor 120, an alarm clock 122 and a battery 124. The casing 118 is formed with an opening in its top which is adapted to be closed by a hinged cover 126 secured in place by a threaded bolt 128 formed with wings 130 at one end and threads 132 at its other end coacting with internal threads on a lug 134, extending laterally from the casing. Access to the interior of the casing is provided through the opening in the top.

A water tight pump casing 136 is connected to one end of the casing 118 by means of a tubular extension 138 and connected at one end to an opening in the adjacent end of the casing 118 and at its other end to an opening in the pump casing 136. Inside the pump casing 136 there is pump mechanism 140. The pump casing is formed with an inlet 142 and an outlet 144, the outlet having a connecter 146 at its free end for connecting one end of a hose 148. The other end of the hose 148 is equipped with a nozzle or spray head 150 formed with an externally screw threaded neck portion 152 and a perforated head portion 154.

In use, the alarm mechanism of the alarm clock 122 is set to become activated at a certain predetermined hour for activating the motor and pump. The inner end of the hose 148 is connected to the outlet 144 of the pump casing 136 by means of the connecter 146. The hose 148 is sufficiently long to extend beyond the end of the spout 110 to permit the spray head 150 to spray water on the soil 158 and plants 98' in a plant box 160. The water 40' in the water can is sucked up through the inlet 142 and pumped through the outlet 144 of the pump into the hose 148.

FIGS. 8 and 9 illustrate another modified form of the invention wherein the container is in the form of a water can 10''. Can 10'' differs from can 10' of FIG. 4 in that the handle is in the form of a metal strap 116'' instead of a bail type handle, and the spout 110'' has no threads at the free end thereof.

In this form of the invention a portable casing 156 is provided for placing inside the can 10'' on the bottom wall 18'' thereof, the pump 136a, motor 120a, clock 122a and battery 124a. The casing 156 is oval in configuration and is sectional including a section 158 with external threads along its reduced open end 160 and including a section 162 with internal threads on its open end 164 for coacting with the threads on the section 158. A partition wall 166 extends across the interior of the section 162 with a central opening therein. The partition wall with the wall of the casing section 162 defines a compartment 168 and housing the pump with the wall of the section 158 defines a compartment 170 housing the motor, clock and battery. Section 162 is formed with a central opening 172 and with a side opening 174.

The hose 148a is formed with external screw threads 176 at one end.

In use, assuming that there is water in the can 10'' and the alarm clock 122a has been set to a predetermined hour, for activating the motor and pump, the hose 148a is inserted through the spout 110a, through the end opening 172 in the casing 156 and threaded into the pump outlet 144a. When the predetermined hour arrives, the pump will pump the water through the hose 148a and out through the spray head 150a for any desired purpose.

A modified form of the invention shown in FIGS. 10 and 11 differs from the form of the invention shown in FIGS. 4 to 7, inclusive, in that the spout 110x of the can 10x is formed with a head 178 having internal screw threads 180 provided with a removable threaded and perforated closure cap 182.

In this form of the invention, the spray head 150x is oval in configuration with external screw threads 184 at one end and perforations 186 at the other end.

In use, the can 10x may be used without the hose 148x by threading the cap 182 onto the head 178 and merely tilting the can 10x to permit the water 40x to flow out through the spout 110x and spray head 150x by gravity for any desired purpose.

When using the hose 148x the cap 182 is removed from the spout and the hose inserted through the spout to the inside of the can 10x and connected to the pump (not shown) whereby water will be pumped through the hose and out through the spray head 150x for any desired purpose.

Another use is by pulling the hose 148x through the spout 110x to the inside of the can 10x and threading the threaded end 184 of the spray head 150x into the spout head 178 and pumping the water through the hose 148x and spray head 150x.

Referring now to the modified form of combined casing and sprayhead casing 156aa shown in FIG. 12, for housing the pump 136aa, motor 120aa, clock 122 aa and battery 124aa and spraying the water, herein the casing 156aa is similar in shape to the casing 156 but is formed of a single piece and is not sectional. The casing 156aa is formed with an opening 172aa at one end and with outlet perforations 186aa at its other end. Adjacent the opening 172aa, the end is formed with external screw threads 184aa. Water inlet openings 174aa are formed in the end with the opening 172aa.

The pump 136aa is formed with an elongated outlet 144aa terminating in a flared portion 190 spanning a number of the outlet pr perforations 186aa. The hose 148aa extends through the opening 172aa and is operatively connected to the inlet of the pump. The clock 122aa is provided with a switch 192 access to which is provided with a removable cover 194 seated in a threaded opening 196 in the casing 156aa. The motor 120aa, clock 122aa, battery 124aa and pump 136aa are operatively connected similar to the connection shown in FIG. 9.

In use, assuming that the alarm clock mechanism has been properly set for a predetermined hour, when the hour arrives the pump will be activated pumping water from the hose 148aa out through the outlet 144aa, flared end 190 and perforations 186aa for any desired purpose.

Another use is to mount the casing 156aa onto the threaded head 178 of the spout 110x shown in FIG. 10, after having pulled the hose 148aa into the interior of the can, such as can 10x shown in FIG. 10, then by manipulating the can, when the pump is activated, the water will be sprayed through the perforations 186aa.

Any of the devices can include a music box as indicated at M as shown in FIG. 9 that will play when the water is poured, the timer activating the same.

While I have illustrated and described the preferred embodiments of my invention it is to be understood that I do not limit myself to the precise construction herein disclosed and that various changes and modifications may be made within the scope of the invention as defined in the appended claims.

I claim:

1. Apparatus for automatically feeding water at spaced time intervals to one or more articles comprising a housing for containing a supply of water, means for evacuating the water from said housing at spaced intervals, means for carrying said evacuated water to one or more articles, said housing being a rectangular box with an opening in the front thereof, a tiltable container in said housing holding a supply of water, said container having an open top, the means for evacuating water from the housing including an alarm clock in the opening in the front of the box, and means of operative connection between the alarm clock mechanism and the tiltable container, said means for carrying the evacuated water to one or more articles including a hose operatively connected to the container and branch hose lines connected to said hose, said means of operative connection between the alarm clock mechanism and the tiltable container including a shaft operatively connected to the alarm clock mechanism and projecting from the alarm clock, a pair of spaced upright brackets secured to the bottom of the box, stub shafts rotatably supported at the top of said brackets mounting said container and a joint connecting one of said stub shaft and the shaft connected to the alarm clock mechanism.

2. Apparatus for automatically feeding water at spaced time intervals to one or more articles as defined in claim 1 wherein the box has a top wall, said top wall having an opening in the center thereof, a screen fixed across said opening, and a hinged cover adapted to close said opening, the other of said stub shafts having an extension and a knob fixed on the outer end of said extension whereby the tiltable container is adapted to be manually tilted.